B. C. MOISE.
TORPEDO NET.
APPLICATION FILED JULY 26, 1918.

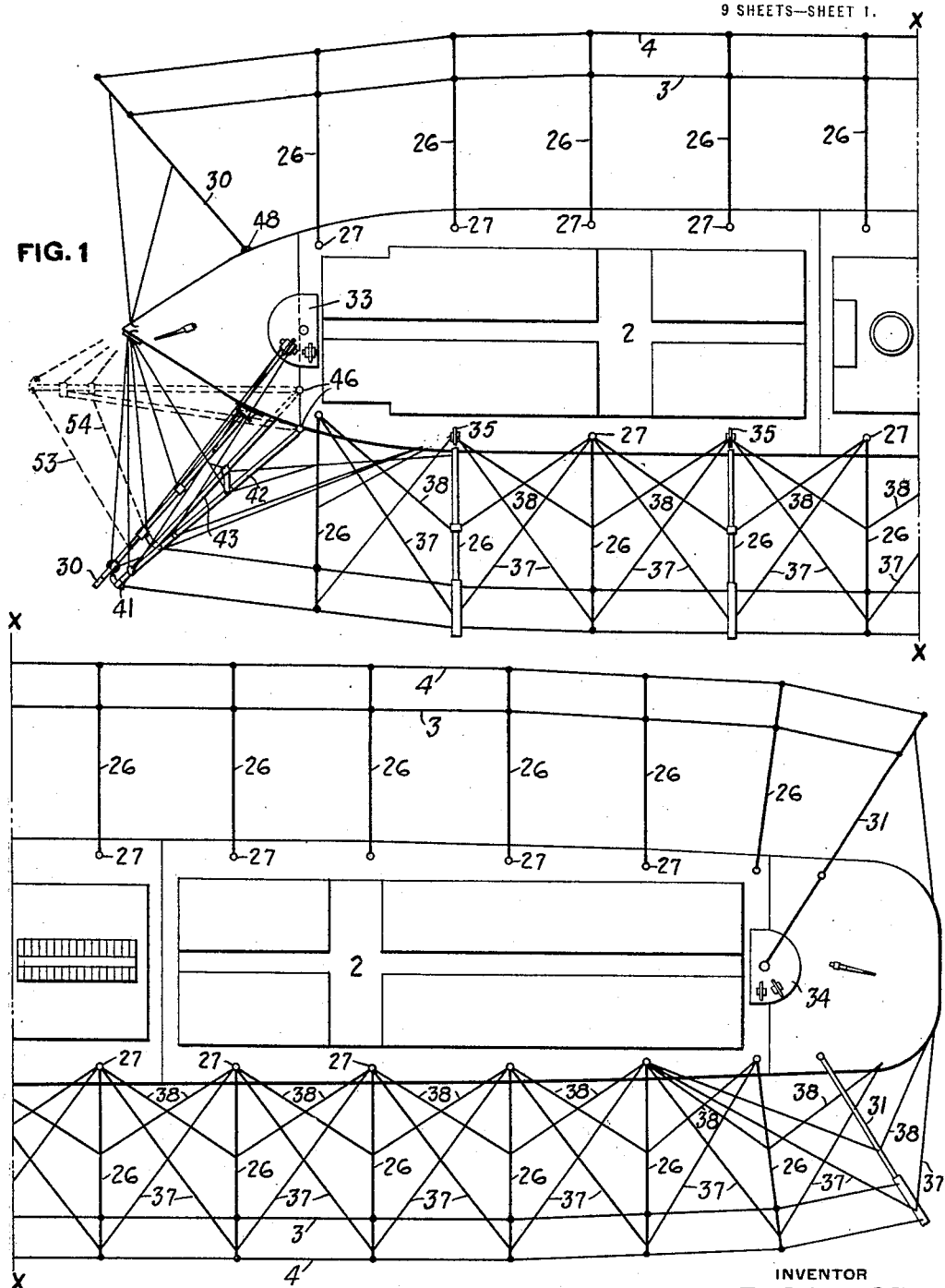

1,324,919.

Patented Dec. 16, 1919.
9 SHEETS—SHEET 2.

INVENTOR
B.C. MOISE
by D Anthony Usina
Attorney

B. C. MOISE.
TORPEDO NET.
APPLICATION FILED JULY 26, 1918.

1,324,919.

Patented Dec. 16, 1919.
9 SHEETS—SHEET 3.

INVENTOR.
B.C. MOISE
by D. Anthony Usina
Attorney.

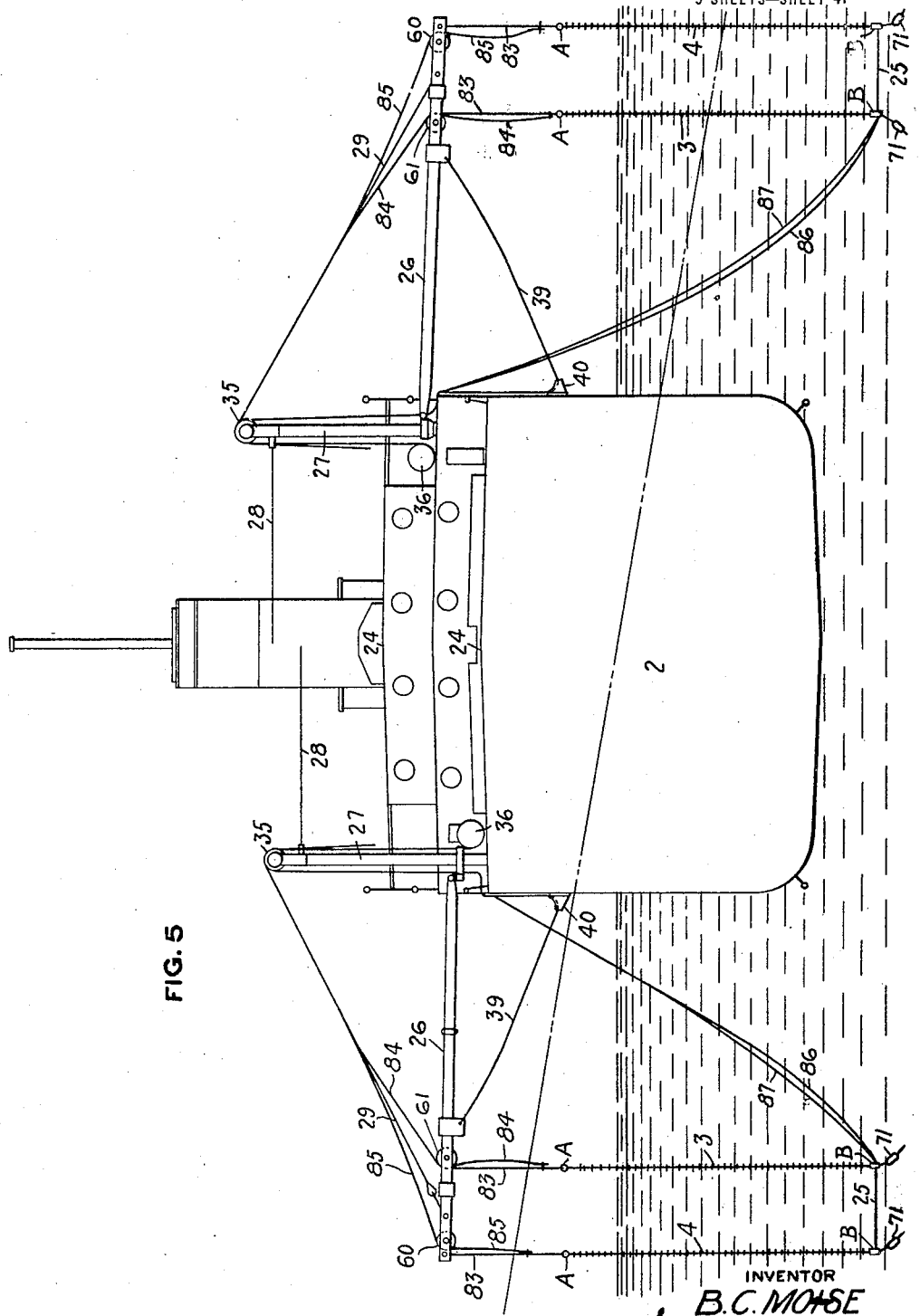

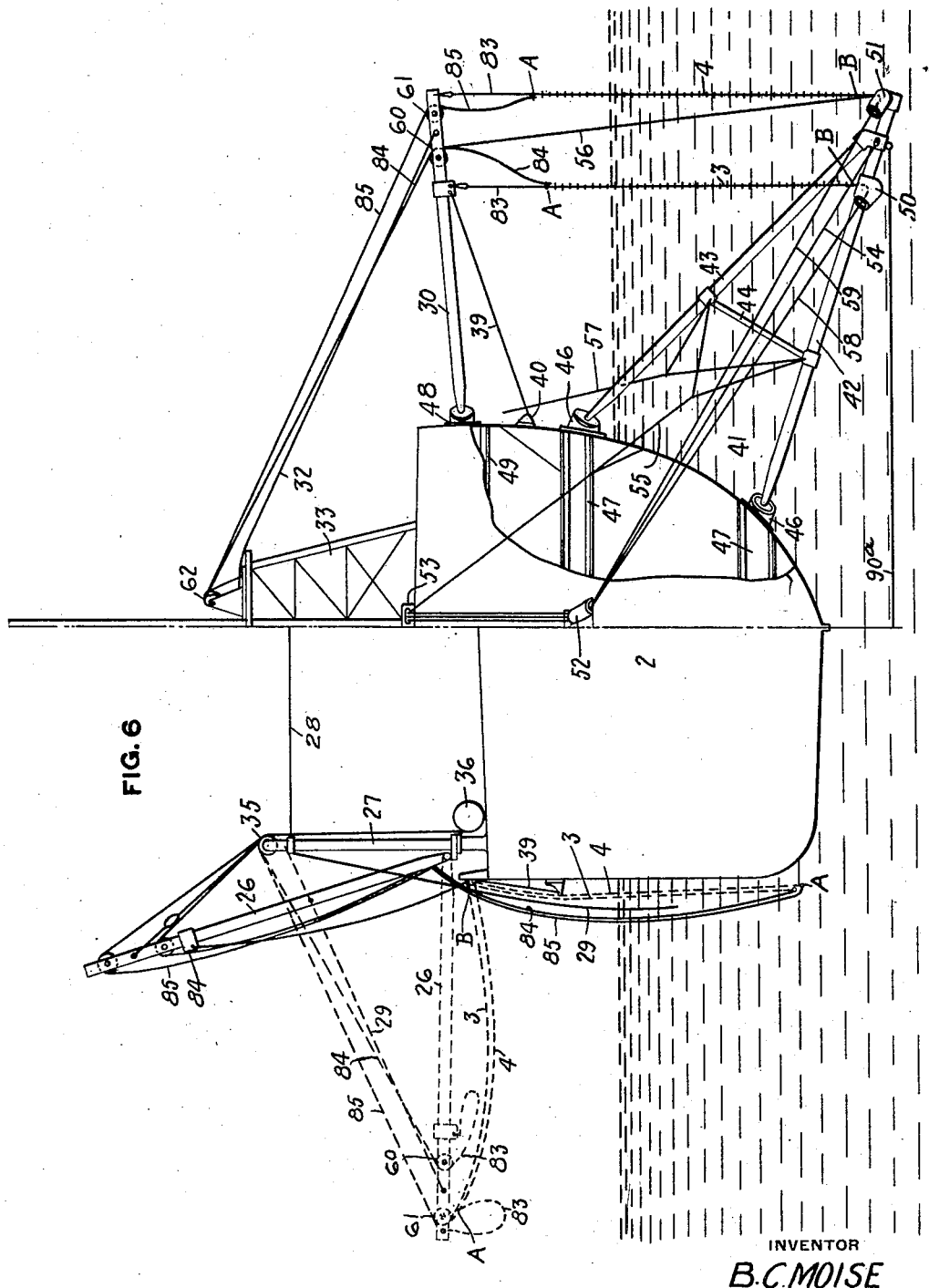

B. C. MOISE.
TORPEDO NET.
APPLICATION FILED JULY 26, 1918.
1,324,919.
Patented Dec. 16, 1919.
9 SHEETS—SHEET 6.
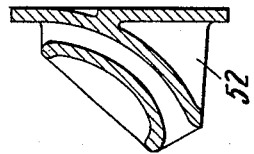
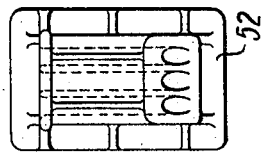
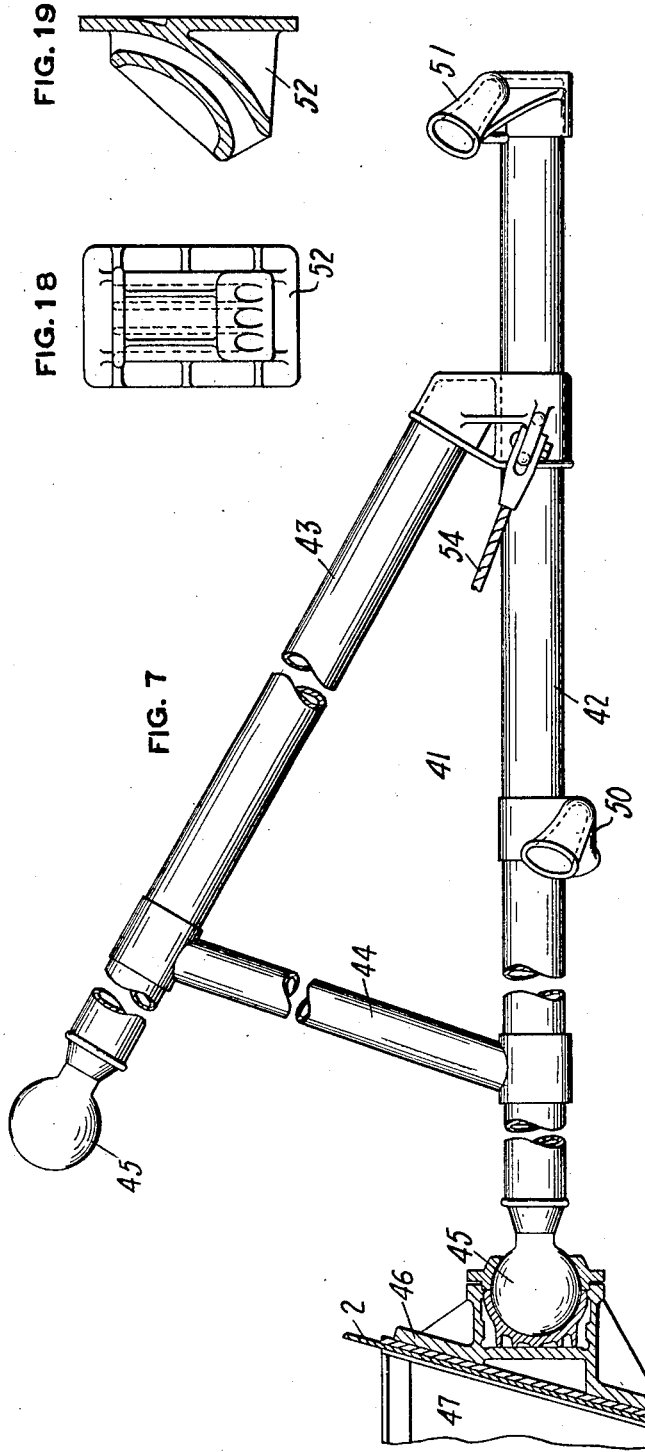
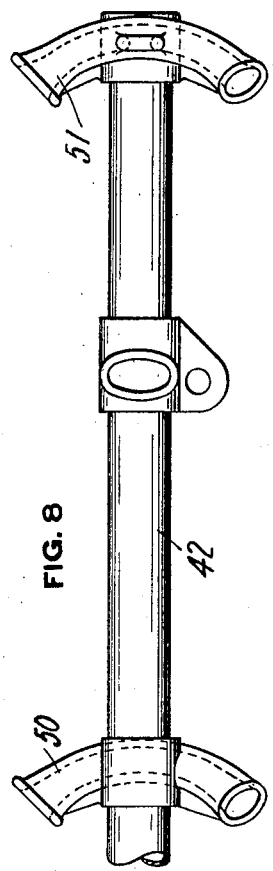
INVENTOR.
B.C. MOISE
by D. Anthony Usina
Attorney

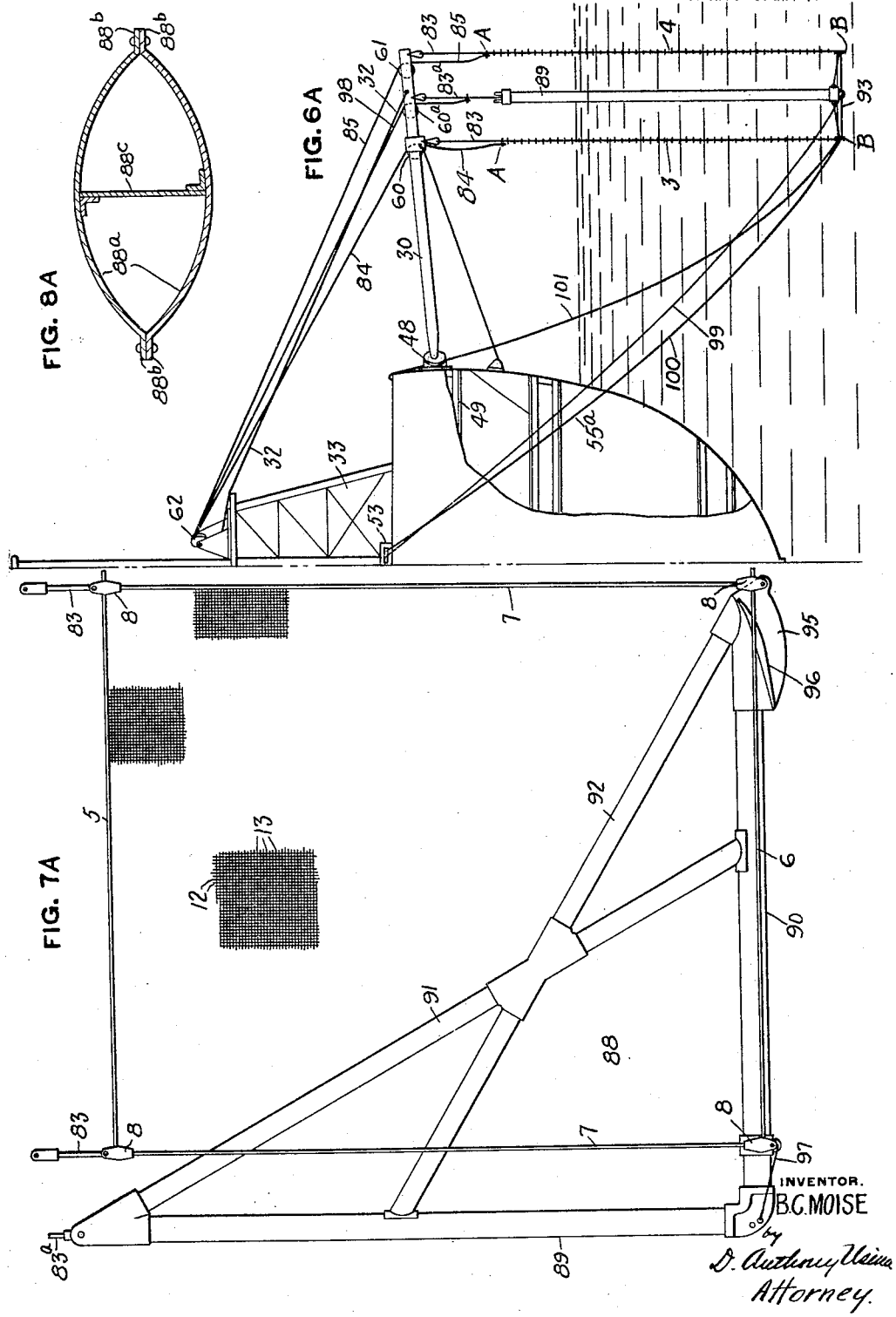

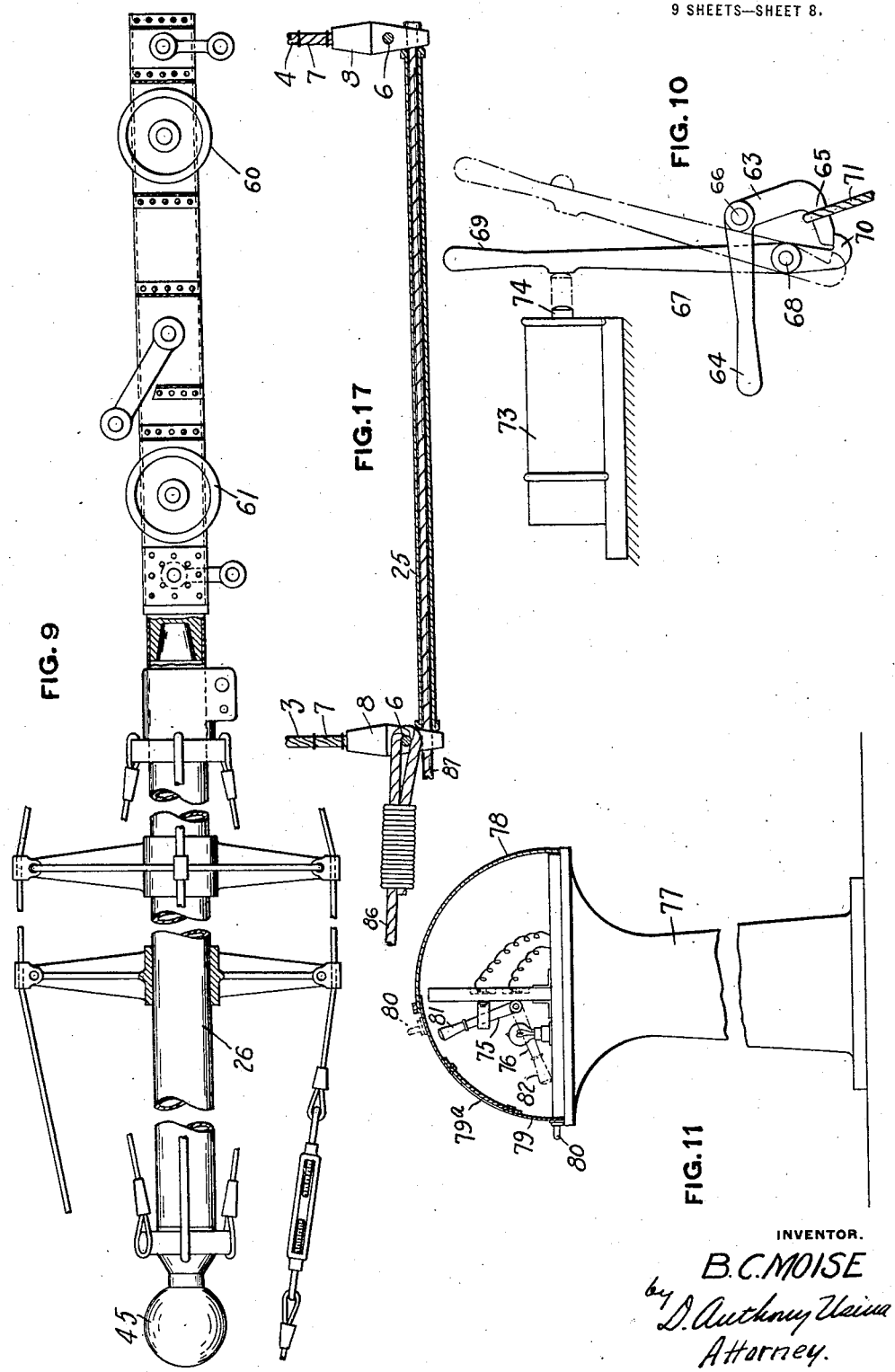

B. C. MOISE.
TORPEDO NET.
APPLICATION FILED JULY 26, 1918.
1,324,919.
Patented Dec. 16, 1919.
9 SHEETS—SHEET 9.
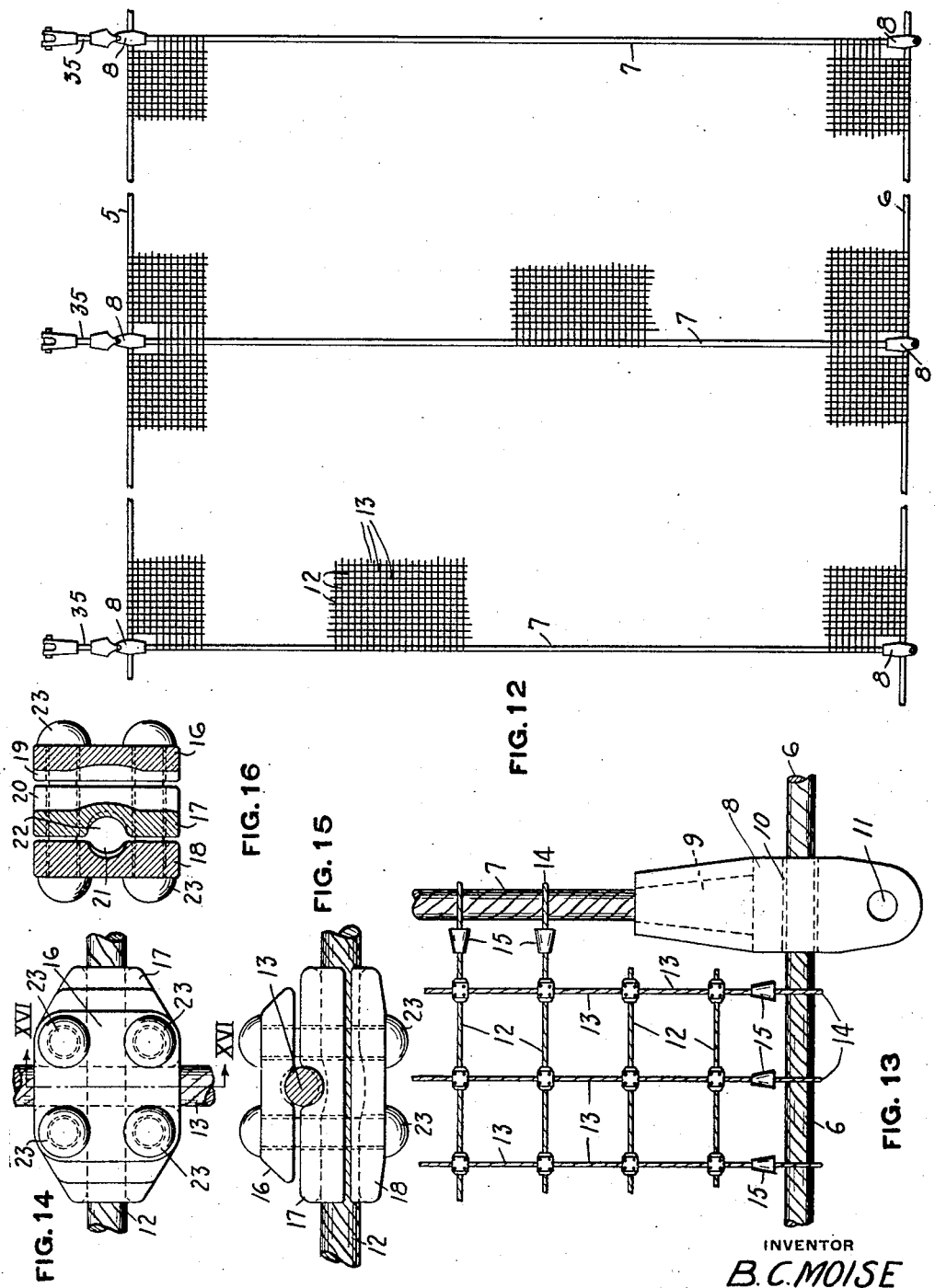
INVENTOR
B.C. MOISE
by D. Anthony Usua
Attorney

UNITED STATES PATENT OFFICE.

BOLTON C. MOISE, OF PITTSBURGH, PENNSYLVANIA.

TORPEDO-NET.

1,324,919. Specification of Letters Patent. Patented Dec. 16, 1919.

Application filed July 26, 1918. Serial No. 246,914.

*To all whom it may concern:*

Be it known that I, BOLTON C. MOISE, a citizen of the United States, and resident of Pittsburgh, in the county of Allegheny and State of Pennsylvania, have invented certain new and useful Improvements in Torpedo-Nets of which the following is a specification.

My invention has relation to the construction of nets formed of wire ropes or cables, and used in the protection of ships or other vessels from the onset of torpedoes and like projectiles. The invention more particularly relates to the provision on a ship or other vessel of a novel torpedo net and net handling mechanism having improved means whereby torpedo attacks are repelled and sinking or other damage to the vessel by such projectiles is avoided and prevented.

One object of this invention is the provision on a vessel of a torpedo net and net handling mechanism of improved construction and having novel means whereby the net is supported on the vessel and is manipulated in shifting the net in to and out of operative or torpedo repelling position.

Another object of the invention is the provision on a vessel of a torpedo net and net handling mechanism having improved means whereby the net is maintained in position to avoid interference with or lessening of the speed of the vessel, in readiness to be instantly moved into its torpedo repelling position.

Another object of this invention is to provide a torpedo net and net handling mechanism having novel means whereby the net is handled or manipulated in unshipping the net when the vessel is docked or in port, and interference with or delay in the loading and unloading operations are avoided and overcome.

Another object of my invention is to provide a net handling mechanism having novel means whereby the nets are easily and quickly manipulated at all times and in all kinds of weather and whereby the necessity of lifting the nets bodily in shipping and unshipping the nets is avoided and overcome.

A further object of the invention is the provision of a net handling mechanism constructed and arranged to permit of the net being easily and quickly released and dropped overboard in preparation for launching the life boats or abandoning the ship or vessel.

A still further object of my invention is to provide a net supporting and handling mechanism which is self-contained, and thereby enables the thrust and dead weight of the nets to be transmitted to and carried by the deck instead of on the sides of the vessel.

A further object of the invention is the provision on a vessel of a dependent torpedo net having separate and independently constructed sections or panels, and having improved means for securing the panels in assembled position and for suspending the depending net at a distance from the sides of the vessel so as to extend vertically from above to a considerable distance below the water line of the vessel.

A still further object of this invention is the provision on a vessel of a double torpedo net which is hung overboard, at a distance from the sides of the vessel, and which is provided with novel means for maintaining the lower edges of the dependent nets in spaced relation when in operative or torpedo repelling position.

A still further object of the invention is the provision on a vessel of a double torpedo net and net handling mechanism having the novel constructions, combinations, and arrangement of parts, shown in the drawings, to be fully described hereinafter, and to be particularly pointed out in the appended claims.

Referring now to the drawings forming part of this specification, Figure 1 is a diagrammatic plan showing the bow end of a vessel from amidships forward, having a torpedo net and net handling mechanism constructed and arranged and applied for use thereon in accordance with my invention.

Fig. 1^A is a diagrammatic plan similar to that of Fig. 1, showing the forward end of the vessel provided with a modified and preferred form of apparatus for use in holding the forward end of the torpedo nets in torpedo repelling position.

Fig. 2 is a similar diagrammatic plan showing the stern end of the vessel, from amidships aft, with its portion of the torpedo net and net handling mechanism.

A complete plan of the vessel will be had by connecting Fig. 1, or Fig. 1^A with Fig. 2 on the broken lines X—X of these figures.

Fig. 3 is a diagrammatic side elevation showing the bow end of a vessel from amidships forward, with the torpedo net suspended therefrom in torpedo repelling position.

Fig. 3^A is a diagrammatic side elevation similar to that of Fig. 3, showing the modified form of apparatus of Fig. 1^A, as applied for use in holding the forward end of the torpedo nets in torpedo repelling position.

Fig. 4 is a similar view showing the stern of the vessel, from amidships aft, with the torpedo net suspended therefrom in torpedo repelling position.

A complete longitudinal side elevation or profile of the vessel will be had by connecting Figs. 3 or 3^A with Fig. 4 on the broken lines Y—Y of these figures.

Fig. 5 is a sectional end elevation, on the line V—V of Fig. 4, showing, diagrammatically, the vessel and torpedo net illustrated in Figs. 1 to 4, with the net in torpedo repelling position.

Fig. 6 is an end elevation, partly in section, the right-hand half showing the bow of the vessel and the left-hand half of this figure being in section, the section being taken on the line VI—VI of Fig. 3.

Figure 1A:
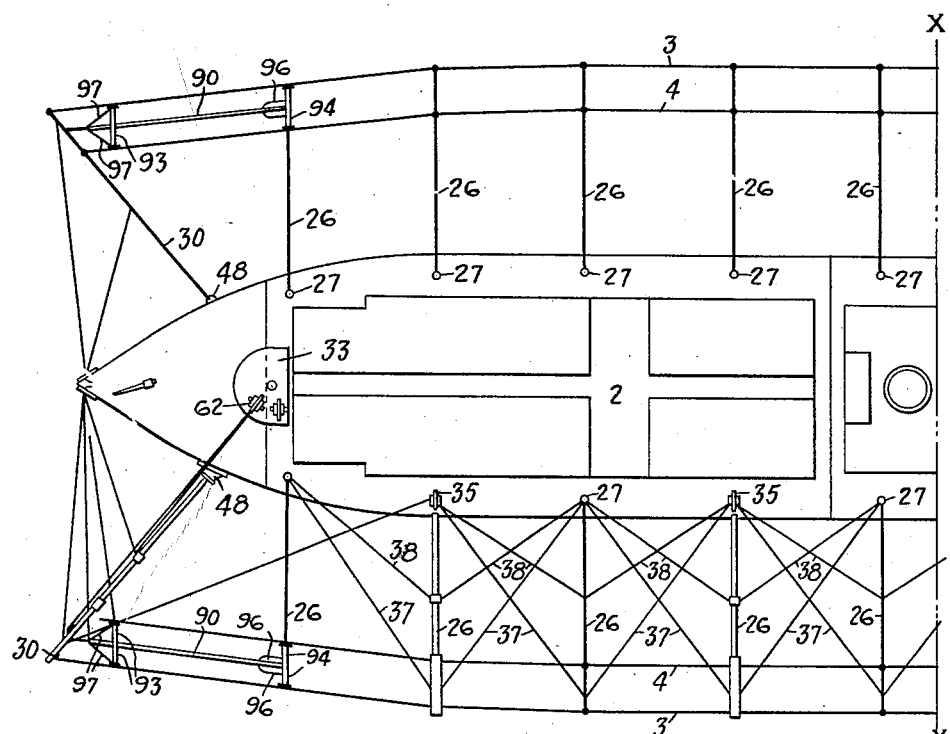

Fig. 6^A is an end elevation similar to the right-hand half of Fig. 6, showing the modified form of net holding apparatus of Figs. 1^A and 3^A in operative position at the bow of the vessel.

Fig. 7 is a plan showing details in the construction of the submerged strut by which the forward or bow end of the net is held in position when suspended in the water in torpedo repelling position.

Fig. 7^A is a plan showing details in the construction of the corner frame forming the modification shown in Figs. 1^A, 3^A, and 6^A.

Fig. 8 is a side elevation of the strut of Fig. 7.

Fig. 8^A is a transverse section on a larger scale, showing details in the construction of the hollow or tubular arms of the corner frame forming the modified apparatus of Fig. 7^A.

Fig. 9 is a plan, partly in section, showing a preferred construction for the booms used in supporting and handling the torpedo nets.

Fig. 10 is an elevation showing details in the construction of one form of tripping mechanism, adapted for use in holding and releasing the swinging edge of the nets when arranged in accordance with my invention.

Fig. 11 is a sectional elevation showing details in the construction of one form of switch mechanism adapted for use with the tripping mechanism of Fig. 10.

Fig. 12 is a plan showing details in the construction of the net panels or sections.

Fig. 13 is a plan showing details in the construction and relative arrangement of the longitudinally extending strand ropes, and vertically extending stay ropes forming the mesh of the net panels or sections.

Fig. 14 is a plan showing details in the construction of a preferred form of rope clamp forming part of this invention, as used in fastening the stay ropes to the strand ropes at the intersections of these ropes in constructing the net panels.

Fig. 15 is a side elevation of the clamp shown in Fig. 14, showing the application of the clamp in rope holding position.

Fig. 16 is a sectional end elevation of the rope clamp of Figs. 14 and 15, the section being taken on the line XVI—XVI of Fig. 14.

Fig. 17 is a sectional plan showing the construction of the separator or spreader of which the lower edges of the nets are kept in spaced relation when in torpedo repelling position.

Fig. 18 is a plan, and Fig. 19 is a sectional side elevation showing a hawse pipe adapted for use as part of my improved net handling apparatus.

In the accompanying drawings, the numeral 2 designates a ship or other vessel having double torpedo nets 3, 4 on each side thereof, with the inner nets 3, 3, and outer nets 4, 4, suspended therefrom in torpedo repelling position, in accordance with my invention.

An inner net 3 and outer net 4 extend from the bow to the stern of the vessel on each side thereof, so as to protect the entire length of the vessel from side attacks by torpedoes, the inner nets 3 serving to engage with and repel a torpedo or projectile which penetrates the outer net 4. (See Fig. 5).

While double nets are used as shown, it is obvious that only a single net on each side of the vessel may be employed when considered advisable or necessary.

When found expedient, a net or a double net (not shown) also will be suspended across the stern of the vessel, so as to protect the vessel from attack from a position directly astern, the net or nets hanging outboard at a distance from the vessel and being suspended and manipulated in the same manner but independently of the nets at the sides of the vessel, as will be readily understood.

When in operative or torpedo repelling position, (that shown in Fig. 5, the depending nets 3 and 4 hang vertically at a considerable distance outward from the sides of the vessel and at a distance from each other. The nets extend from some distance above, to a materially greater distance below the water line of the vessel, with the lower edge of each net at a substantial distance below the horizontal plane of the keel of the vessel, as shown, (see Fig. 5) so as to operate effectively on the high side of the vessel even when the vessel is rolling and is at a considerable angle to the horizontal.

Each of the nets 3 and 4, comprises a series of sections or panels which are rectangular in outline, the frame defining the length and width of the panels being formed of an upper rope or cable 5 and lower rope or cable 6, which extend horizontally, and vertical cables 7, 7, the cables 5 and 6 being connected by the vertical cables 7 at intervals of a length slightly less than the distance between the upper cable 5 and lower cable 6. (See Fig. 12.)

On account of their size and weight, the cables 5 and 6 preferably will be made in sections of a length which can be easily handled, the contiguous ends of the lengths of cable being detachably connected by suitable clamps, or in other approved manner.

Each of the vertical cables 7 is provided with a socket 8 on its ends, and the basket of these sockets may be, and preferably is, connected to the cable ends by first untwisting or "brooming" that end of the cable which is located within the tapering opening 9 of the basket, and the space around the wires within the opening 9 is then filled with molten lead or spelter or similar metal of low fusing temperature, (an old and well known expedient used in fastening sockets on the ends of wire ropes).

Each socket 8 also has a transverse opening 10 in one end thereof, through which one of the horizontal cables 5 or 6 extends in forming the rectangular frame for the net panels. (See Fig. 13). The cables 5 and 6 at the extremities or ends of the nets will be rigidly fastened in the transversely extending opening 10 of the sockets 8, the openings 10 being tapered and cable ends being fastened in the tapering openings in the same manner as has been described above in connection with the vertical cables 7.

The sockets 8 also have openings or eyes 11 in one end by which the nets are connected to the lines used in supporting and manipulating the nets in handling and securing the nets on the vessel in their several positions.

The rectangle forming each panel of the net, i. e.—the space defined by adjacent vertical cables 7, 7, and that portion of the upper and lower cables 5 and 6 between each pair of vertical cables 7, 7, is provided with a wire rope net which is formed of a series of horizontal or strand ropes 12, and vertical or stay ropes 13, these intersecting ropes forming a net, which, in the particular construction shown, has a mesh of about 6 inches, and each net panel being about 40 feet in width.

A loop 14 with a thimble in each loop is formed on each end of the ropes 12 and 13, the loops on the ends of the strand ropes 12 extending around the cables 7, 7, and those on the ends of the stay ropes 13 around the cables 5 and 6 in forming the mesh of the net. Preferably the loops 14 are formed by bending the rope end around a thimble and securing the overlapped portions of the rope together by means of a basket 15 which may be conveniently formed of a piece of wire, the central opening in the basket being filled with molten lead or spelter to fasten it in place on the overlapped portions of the ropes. (See Figs. 12 and 13).

When found necessary or desirable, however, the loops may be formed in the ends of the ropes by lashing the overlapped portions thereof, instead of using the baskets 15 forming the particular means shown.

The strand ropes 12 and stay ropes 13 are fastened together at each intersection thereof, by means of clamps, which, as shown in Figs. 11, 12, and 13, comprise two outer members 16 and 18 and an intermediate member 17, the intermediate member of each clamp being positioned between the ropes 12 and 13. The contiguous faces of the clamp members have semi-circular grooves therein, through which the ropes 12 and 13 extend, the registering grooves 19 and 20 in the opposite faces of the outer clamp member 16 and intermediate member 17 extending at right angles to the grooves 21 and 22 in the adjacent faces of the outer member 18 and other face of the intermediate member 17, as will be clearly seen by reference to Figs. 14, 15, and 16. Registering holes are provided at the corners of the clamp members in which rivets 23 are placed and headed in fastening the clamping members in holding engagement with the intersecting ropes, and all corners on the clamp members are carefully rounded to remove any sharp edges so as to avoid or prevent cutting or other damage to the ropes. The lower edges B of the adjacent nets 3 and 4 are held apart in spaced relation by means of a series of spreaders or separators 25 which may be conveniently formed of pieces of wrought metal pipe, in the manner shown in Fig. 7. The ends of the pipes 25 register with the holes 11 in the thimbles 8 on the lower end of the vertical cables 7 and each of the lines 86 used in handling the lower edge of the outer nets 4 loosely extends through a hole 11 in a thimble 8 on the nets 3 and through a pipe separator 25, one end of each line 85 being fastened in any approved manner to a thimble 8 on the lower edge of the outer net 4. (See Fig. 17).

In equipping a vessel with apparatus embodying my invention, a series of booms 26 and vertical masts 27 are provided on each side of the vessel, for supporting the nets, the lower end of the masts 27 being stepped on the deck 24 of the vessel and the upper ends thereof being stayed, each to an opposite one on the other side of the vessel by means of a line 28. Each boom 26 is pivoted at one end to or adjacent to the lower end of one of the masts 27 and the outer or swinging end of each boom when in lowered or net supporting position is connected by a guy line 29 to the upper end of a mast 27.

By erecting the net supporting booms 26 and the masts 27 on the deck of the vessel with the upper ends of the masts on one side connected by the lines 28 with those on the other side of the vessel, the weight of the nets on one side counterbalances that of the nets on the other side and a self-contained structure is obtained. The weight of the nets and supports therefor, being a dead load on top of the deck, all stresses due to the nets are removed from the sides of the vessel and the possibility of the supporting structure being torn loose from or staving in the sides of the vessel in a heavy seaway is avoided and overcome.

A boom 30 at the bow and boom 31 at the stern also are provided on each side of the vessel 2 for supporting the upper corners of longitudinal edges of the nets 3 and 4 at the forward and aft ends of the nets. The booms 30 and 31 are constructed in the same manner as the booms 26, but are somewhat longer and heavier, and the inboard end of the forward booms 30 is not pivoted at the lower end of a mast, as are the booms 26, but is pivotally secured in a bearing 48 on the side of the vessel, the bearing 48 preferably being similar to the bearings 46 for the pivoted end of the legs of the submerged struts 41, a construction to be described later. (See Figs. 1, 2, 3, 4 and 6.) The booms 30 and 31 at the ends of the vessel are arranged to extend lengthwise in a vertical plane at an angle of approximately 45 degrees to the longitudinal center of the vessel, when holding the nets in torpedo repelling position, (see Figs. 1 and 2) and have guy lines 32 on their outer ends which extend inboard and are fastened to the top of the derrick 33 at the bow, and the derrick 34 at the stern of the vessel.

The outer ends of the guy lines 29 are detachably connected to the outboard end of the booms 26, the inner ends of the lines ordinarily passing over sheaves 35 positioned on top of the masts 27 and then extending downwardly and ordinarily being operatively connected to the spools 36 of the winches or equivalent hoisting devices used in raising and lowering the booms 26. The hoisting devices are also used in operating the hoisting ropes 84 and 85 connected to the upper edges of the nets 3 and 4 when manipulating the nets in moving them into and out of torpedo repelling position, as is to be explained.

When the nets 3, 4, are unshipped, as is the case when the vessel is in port, the booms 26 are made available for use as cargo booms in loading and unloading the vessel, so that the usual cargo booms need not be provided. When the vessel is equipped with cargo booms, they will be used in supporting the nets and will be supplemented with a sufficient number of booms 26 and masts 27 to adequately support the nets on the vessel.

The guy lines 29 may be dispensed with in some cases, but when used they not only will serve in supporting the outer ends of the lowered booms 26 but may also be employed in raising and lowering the swinging outer ends of the booms. (See Figs. 5 and 6.)

The booms 26 and also the booms 30 and 31, when in lowered, or net supporting position, as shown in Fig. 5, are stayed at their outer ends by diagonal guy lines 37 and, at an intermediate point in the length of the booms, by diagonal guy lines 38. Diagonal guy lines 39, which extend through hawse pipes on the sides of the vessel, are employed to prevent upward lifting movement of the booms relative to the vessel, (see Figs. 1, 2, 5 and 6), the lines 37, 38, and 39 passing inboard, and after being made taut are fastened inboard, in tightened position.

Figure 3:
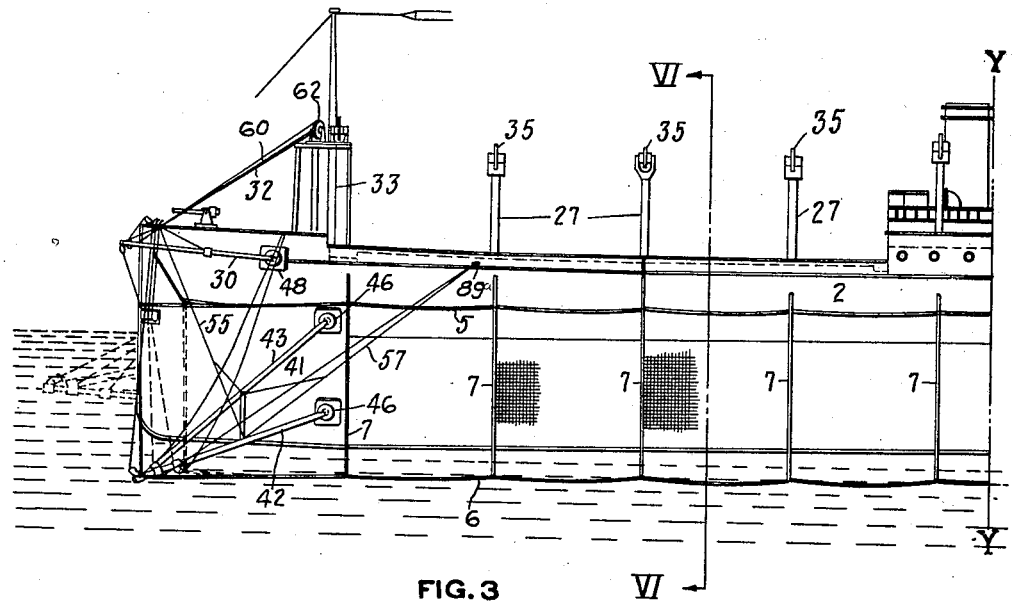
Figure 4:
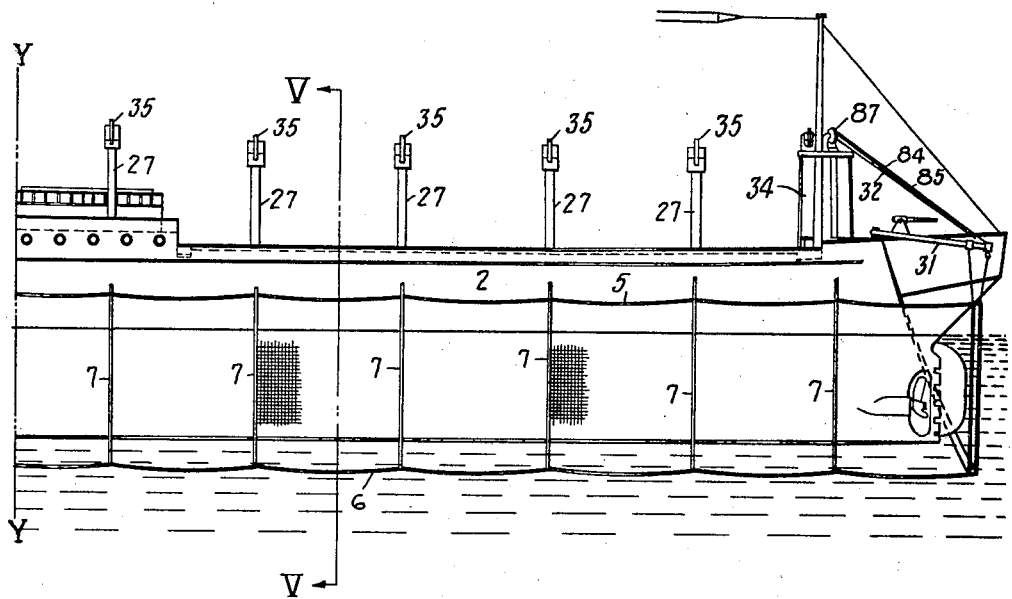
Figure 3A:
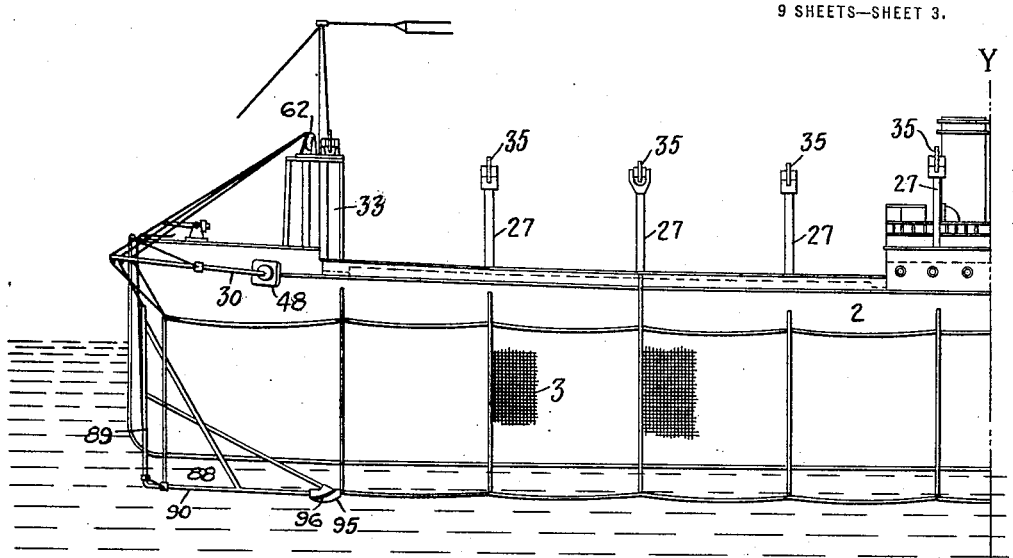

A submerged strut 41 is provided on each side of the vessel at the bow end thereof in the apparatus of Figs. 1, 3, and 6, to take the enormous lateral thrust put upon the forward end of the nets 3, 4, when the vessel is under way and the suspended nets are depending therefrom in operative or torpedo repelling position.

The strut 41, as is shown in detail in Figs. 7 and 8, is formed of a long tubular leg 42 and shorter leg 43, the leg 43 being rigidly fastened at one end to the leg 42 at a short distance from the front end of the long, lowermost leg 42. A tubular separator 44 rigidly connects the two legs and holds the rear ends of the legs in spaced relation and one end of each leg has a spherical bearing surface 45 thereon by which the strut 41 is pivotally secured in bearings 46, 46, which are fastened to the sides of the vessel. (See Figs. 6, 7, and 8.) While shown formed of tubular members, the struts 41 may be made of structural shapes, as will be readily understood.

The struts 41 have one end of each leg 42, 43 thereof pivotally connected, one above the other, to the side of the vessel 2 so as to permit the outer end of the strut to swing toward and away from the vessel in a plane approaching the vertical.

Pivoting the struts in this manner enables the struts to be moved forwardly from the net holding position shown by full lines into the inoperative position shown in dotted lines in Fig. 1 and in Fig. 3, or into the position offering the least amount of resistance to the progress of the vessel when the vessel is traveling forwardly, and the nets 3, 4, are suspended from the booms above the water level, in readiness for the lower edge of the nets to fall into the water.

The inner ends 45 of the two legs 42, 43, of the submerged struts, being pivoted one above the other in the bearings 46 on the sides of the vessel 2, prevent vertical lifting movement of the outer end of these struts and maintain the lower edge of the nets 3, 4, in position, when the outer ends of the struts are fastened in net holding position and the vessel is in motion with the nets depending from the booms, (or in the position shown in full lines in Figs. 1 to 5, and on the right-hand half of Fig. 6).

Each of the bearings 46 is connected to a bearing 46 on the opposite side of the vessel by a girder 47, and in like manner the bearings 48 for the pivoted ends of the pair of booms 30 on the bow of the vessel are connected by a similar girder 49, these girders extending horizontally from side to side of the vessel, as is clearly shown in Fig. 6. By this arrangement of the girders 47 and 49, the thrust of the submerged strut 41 on the bearings 46 and boom 30 on the bearing 48 on one side is counteracted by that of the strut 41 and boom 30 on the other side of the vessel and the load is taken off the strakes and side plating of the vessel.

The submerged struts 41 have a hawse pipe 50 near the outer end, and a similar hawse pipe 51 at the outer end thereof. (See Figs. 6 and 7).

A triple hawse pipe 52 and a hawse pipe 53 are provided at the bow on each side of the vessel for the lines 58, 59, and the lines 54 by which the swinging end of the strut 41 is moved.

The swinging outer end of the submerged struts 41 is moved into and is held in operative or net holding position (as shown in full lines in Figs. 1, 3, and on the right-hand half of Fig. 6) and in its inoperative position (which is shown in dotted lines in these figures) by means of a series of heavy cables 54, 55, 56, and 57, these cables extending inboard and being connected to the drum of a winch or other suitable hoisting mechanism, and the lower corners of the nets 3, 4, at the forward ends theerof are drawn forward and held in place by the cables 58 and 59, which extend through the hawse pipes 50, 51, on the strut 41 and are manipulated and fastened inboard in the same manner.

A line 90$^a$ which extends across the bow of the vessel 2 and is connected to the outer ends of the submerged struts 41, 41, restricts the amount of rearward swinging movement of the struts. (See Fig. 6).

The cable 54 which is fastened by one end to the outer end of the strut 41 and which extends through the hawse pipes 52 and 53 and then inboard, is used in holding this strut in operative or net holding position and in hauling the strut into inoperative position. The cable 55 which extends inboard through the hawse pipe 53 and the line 56 which extends around a sheave 60 on the outer end of the boom 30 and is led inboard over a sheave 62 on top of the derrick 33 are also used in supporting the swinging submerged strut 41 and in moving it into and out of operative position. The cable 57 which is fastened by one end to the strut 41 and extends inboard through the hawse pipe 40 on the side of the vessel (see Figs. 1, 3, and 6) provides means for positively moving the strut 41 from its inoperative position into the operative position, and also assists in supporting the strut in its operative position.

In the modified apparatus of Figs. 1$^A$, 3$^A$, and 6$^A$, the submerged strut 41 is dispensed with and the knee or corner frame 88 of Figs. 1$^A$, 3$^A$, and 6$^A$ (which is shown in detail in Figs. 7$^A$ and 8$^A$) is substituted therefor to hold the lower corner of the forward end of the nets 3 and 4 against lengthwise and lateral movement, and to prevent lifting movement thereof, when the vessel is moving ahead with the nets in torpedo repelling position.

The knee 88 of which one is used for each pair of nets 3, 4, is formed of two hollow tubular legs 89 and 90, which extend lengthwise at right angles, one end of the horizontal leg 90 being rigidly fastened to the lower end of the vertical leg 89. (See Fig. 7$^A$).

The upper end of the vertical leg 89 of the knees is detachably suspended, by a short line 83$^a$ similar to the lines 83, from the outer or swinging end of the forward booms 30, at the bow of the vessel. The uper end of the vertical leg 89 of the knee is rigidly connected by a diagonal brace 91 to an intermediate point in the length of the horizontal leg 90, and the outer end of the horizontal leg is rigidly fastened by a similar diagonal brace 92 to an intermediate point in the length of the vertical leg. The legs of the corner frame 88, as shown, are elliptical in cross section, and are formed of two dished plates 88$^a$ having marginal flanges 88$^b$ by which the plate sections are united with a stiffening web 88ᶜ on the interior of the legs of the frame. The diagonal braces 91 and 92 are united at the point of intersection thereof, so that a rigid corner frame is thereby formed. Being formed of hollow members, (see Fig. 8ᴬ) the legs 89 and 90 and the diagonal braces 91 and 92 form a light, but strong and very rigid structure.

The horizontal leg 90 of the frame extends lengthwise between the nets 3 and 4, and this leg is provided adjacent to each end thereof with horizontal spreaders or separators 93 and 94 by which the lower edges of the nets are maintained in spaced relation, and by which lifting movement of the lower corner of the nets at the forward end thereof is prevented.

One end of the horizontal leg 90 of the corner frame 88 is provided with a heavy weight 95 to assist in holding it against lifting movement, and this end of the leg also is provided with fins or blades 96, 96 on opposite sides thereof. These blades have substantially plane surfaces which are inclined lengthwise at an angle to the horizontal, so that when the vessel is moving forwardly the water exerts a downward pressure on the inclined wings 96 which aids in preventing lifting movement of the frame 88 and ends of the nets 3, 4, at the lower edge thereof. The outer ends of the separators 93 are stayed by short lines 97, 97, to the elbow connecting ends of the legs of the frame. (See Figs. 1ᴬ and 7ᴬ).

The upper end of the vertical leg 89 of the corner frame 88 also is connected to one end of a line 98 which passes over a sheave 60ᵃ on the boom 30, and then extends inboard over a sheave 62 on top of the derrick 33 in the same manner as the net handling lines 84, 85. The lower corners of the nets are fastened to the outer ends of the arms on the horizontal leg of the corner frame.

Lines 99, 100, and 101, which are connected to the forward end of the nets and the corner frame, pass inboard for lifting the end of the nets and the corner frame when the nets are being moved from the position shown in Fig. 6, into the sailing position shown by dotted lines at the left in Fig. 6.

Lines 84 and 85 are employed to support the nets 3 and 4 at their upper edges when moving the nets into and out of the inoperative suspended position in which the nets are carried while the vessel is under way in safe waters. The lines 84 and 85 are also used in conjunction with the series of lines 86 and 87 connected to the lower edges of the nets 3, 4, in unshipping and again shipping the nets, as is done each time the vessel is docked to be loaded or unloaded. (See Figs. 5 and 6). The lines 84, which have one end fastened to the upper edge of the nets 3, pass around a sheave 60 on the outer ends of the booms 26 and around a sheave 35 on top of the mast 27, then extending to the deck of the vessel and being operatively connected to the drums 30 of the winches used in operating the lines. The lines 85 are fastened to the upper edge of the nets 4 and pass around a similar sheave 61 on the booms 26 and extend over a sheave 35 on top of the masts 27 and to the deck of the vessel in the same manner as the lines 84.

When desired the short lines 83 may be omitted and the lines 84 and 85 used to support the nets 3, 4, in torpedo repelling position, as well as for raising and lowering the nets.

For example, with the lines 83 omitted, the nets 3 and 4 will be supported by the lines 84, 85, with the inboard end of these lines detachably fastened in net supporting position. To rig the nets in this way is of advantage because both edges of the torpedo nets will be detachably fastened to the vessel 2 and can be simultaneously released, causing the nets to be dropped overboard instantly, when it is desired to launch the life-boats or to abandon the vessel.

The guy lines 32 fastened at one end to the derrick 33 are employed to support the outer, swinging end of the booms 30 in lowered position. The booms 31 at the stern of the vessel are supported in a similar manner from the derrick 34 by means of guy lines 32. Each boom 30 and 31 also has net hoisting cables or lines 84 and 85, connected to the upper corners of the nets 3 and 4 at the forward end of the nets, the lines 84 and 85 at the upper corners of the nets extending around sheave wheels 61 and 62 on the outer ends of the booms 30, and then leading upwardly and inwardly, and passing around sheaves 62 on top of the derrick 33. Similar lines 84 and 85 which are connected to the upper corners at the other end of the nets 3 and 4, pass around the sheaves 61 and 62 on the outer end of the booms 31 and lead inwardly and upwardly over the sheaves 87 on top of the derrick 34 at the stern of the vessel. The lines passing around the sheaves on top of the derricks 33, 34 then extend downwardly and are connected to winches or other hoisting apparatus on the deck of the vessel in the same way as the lines 84 and 85 which extend over the sheaves 35 on top of the masts 27. (See Figs. 3 and 4).

The lower edges of the inner nets 3, 3, are connected at short intervals in the length thereof, to the series of lines 86, and the lower edges of the outer nets 4, 4, are similarly connected to one end of the series of lines 87, the lines 87 extending loosely through the pipe separators 25 by which the lower edges of the pairs of nets 3, 4, are maintained in spaced relation. The lines 86 and 87 extend upwardly and inwardly to the deck of the vessel, and after passing over sheaves at the side of the vessel are connected to the spools or drums 36 of the winches or other hoisting mechanism used in hauling in on the lines to hoist the lower edges of the nets 3, 4, from the torpedo repelling position shown in Fig. 5, into the suspended position shown by dotted lines at the left-hand side of Fig. 6.

When found desirable or necessary, the lines 87 will be omitted, in such case the series of lines 86 being used to lift the nets 3 with and at the same time as the nets 4. The loops 71 connected to the lower edge of each net 3 and 4 (see Figs. 5 and 10) coact with the tripping mechanism (yet to be described,) in detachably holding the nets in suspended position, i. e.—in the manner shown at the left in Fig. 6.

A tripping mechanism which may be like that shown in Fig. 10, is provided for each of the cables or lines 86, 87, to detachably hold the lower edges of the nets 3, 4, in the suspended position shown at the left in Fig. 6, in readiness to be instantly released, this tripping mechanism when released permitting the nets to swing and instantly fall from the position shown at the left in Fig. 6 into that shown in Fig. 5 and at the right in Fig. 6, i. e.—to be dropped from the position in which the nets are supported while the vessel is in motion into torpedo repelling position.

As will be seen in Fig. 10, the tripping mechanism comprises a lever 63 having a handle 64 on one and a hook 65 on its other end, the lever being pivoted by a pin 66 to a suitable support (not shown). A second lever 67 is pivoted at one end by a pin 68 to the support for the lever 63, the lever 67 also having a handle 69 thereon. The lever 67 has its lower end bent to form a toe or catch 70 for holding the hook end 65 of the lever 63 in cable securing position, the end 65 of each lever 63 engaging with one of the series of loops 71 on the lines 86 and 87 at the lower edges of the nets and by which the lower edges of the nets 3, 4, are detachably held in securing the nets in the suspended position, (that shown in dotted lines at the left in Fig. 6).

Adjacent to each of the levers 67 is a solenoid 73 having a core 74, the solenoid cores being positioned opposite the levers 67 so as to strike the levers and release the catches 70 when the solenoids are energized and the cores 74 are simultaneously propelled outwardly and caused to strike the levers 67. (See Fig. 10).

A controlling mechanism for the tripping mechanism is provided on the bridge of the vessel or in any other suitable position, this mechanism being constructed as shown in Fig. 11. As shown in this figure, switches 75, 76 are mounted on top of a pedestal 77, the pedestal being provided with a switch casing 78 having a sliding cover 79 with a glass front 79ª in the cover, and a handle 80 by which the cover is raised and lowered, to give access to the handles 81 and 82 on the switches 75, 76. One of the switches, which, as shown, are of the ordinary knife type, is operatively connected to the series of solenoids 73 forming part of the tripping mechanism on one side of the vessel. As shown, the switch 75 is connected to the solenoids on one side, and the switch 76 to those on the opposite side of the vessel, so as to be independently operable. When found necessary or desirable, the solenoids on both sides of the vessel may be connected to a single switch, so that when the switch is closed, the solenoids will be energized and all of the tripping mechanisms will be simultaneously actuated, and the nets 3, 4, on both sides of the vessel instantly released and allowed to drop at the same time.

The way in which the torpedo nets are manipulated in handling the nets in accordance with my invention, will now be described.

Assuming that the vessel is docked or in a slip and is being loaded, the nets 3 and 4 will hang over the side of the vessel, as is shown in full lines in the left-hand half of Fig. 6, the heavy lines or cables 29 and 32 for guying the outer end of the booms 26 and the end booms 30, 31 not being in service, but being bunted in at the inner end of the booms and allowed to fall over the side of the vessel, as shown in Fig. 6. When the struts 41 are used the lines 56 and 57, connected to each strut 41 will be loosened, and the lines 58 and 59, which are connected to the corners of the nets at the lower edge thereof, and which extend through the hawse pipes 50 and 51 on the swinging end of the struts 41, will also be slackened. The submerged struts 41, of which there is one on each side of the bow of the vessel, are then moved forwardly by means of the lines 54 and 55, into the position shown by dotted lines in Fig. 3 and in the lower half of Fig. 1, and the booms 26 will be free for use in the vessel loading operations.

When used instead of the struts 41, the corner frames 88 will be lifted and held against the vessel by the lines 99, 100, and 101, the lines 83ª having been detached from the boom 30 and the lines 98 slackened at the same time as the net handling lines 84, 85.

After the vessel has been loaded and is moved out into the harbor, the booms 26 and the booms 30 and 31 are lowered until in the horizontal or outboard position shown in Figs. 1, 2, 3, 4, and 5, and in the right-hand half of Fig. 6, the booms 26 being temporarily supported in lowered position by the lines 85.

The guy lines 29, which have been hanging over the side of the vessel are then carried out along and attached to the outer end of the booms 26, at a point between the supports for the nets 3 and 4. A light hand line which is easily carried will be used in lifting the guy lines 29 into supporting boom position. The lines 84 and 85 running over the forward sheaves 60 and 61 at the outer end of each boom 26 and the booms 30, 31, are then hauled inboard until the heavy cable 5 forming the upper edge A of each net, (which has been hanging at the bottom of the vessel) is pulled out horizontally into a position at the end of the booms 26, (the position shown by dotted lines at the left in Fig. 6). The supporting cables 83 by which the nets are suspended from the booms are then attached by inserting the pins in open sockets used in connecting the lines 83 to the booms 26. When in this position the lower edges B of the nets 3, 4, are detachably held inboard on the vessel by the tripping mechanism, the series of loops 71 on the edge B of the nets, (see Fig. 5), engaging with the hooks 65 of the tripping mechanism, and the nets are in readiness to be instantly lowered into torpedo repelling position, (or position shown in Fig. 5).

When occasion demands the nets to be swung into torpedo repelling position, the net lowering operation is effected by simultaneously releasing the inboard end of the series of lines 86, 87, attached to the cable 5 at the lower edge B of each net 3, 4. This is done by throwing the switches 75 and 76 on the pedestal 77 into closed position, which completes an energizing circuit through all of the coils of the solenoid 73. When the solenoid coils are energized in this manner the solenoid cores 74 are caused to move outwardly and strike against the levers 67, and move these levers on the pivot pins 68 from the holding position shown in Fig. 10, so as to detach the loops 71 on the edges B of the nets and release the loop ends of all of the lines 86 and lines 87. When the lines are detached in this manner the lower edges B of the nets 3 and 4 will fall, and the nets swing instantly into torpedo repelling position. (Shown in Fig. 5). The guy lines 39 running from the booms 26 to the hawse pipes 40 on the sides of the vessel near the water line and up to the deck of the vessel are then made taut and fastened inboard. The lines 54 and 55 holding each of the submerged struts 41 in inoperative position at the bow of the vessel (shown dotted in Figs. 1 and 3) are released at the same time as the lines 86, 87, so that the struts 41 are free to swing outwardly. The struts when used are then moved outwardly by hauling in on the lines 56 until the struts are in the position shown by full lines in Figs. 1 and 6. The guy line 90 connecting the swinging end of the two struts 41 across the bow of the vessel, (see Fig. 6,) will limit the outward swinging movement of the struts.

When the submerged struts 41 of Figs. 1, 3, and 6, 7, and 8, are used to take up the stress due to the friction of the nets in the water and to prevent the lower edge of the forward end of the nets from lifting when the vessel is moving forwardly with the nets suspended in torpedo repelling position, these struts 41 are then stayed in net holding position, a position forming about a 45 degree angle with the center line of the vessel 2. (See Fig. 1). The cables 54 and 55 which extend inboard through the hawse pipe 52 on the bow of the vessel and the lines 56 attached to the struts 41 and passing inboard over sheaves 60 on the boom 30 are then tautened and are fastened to hold the struts 41 in such position.

In securing the struts 41 in net holding position, they are first pulled back until in engagement with the marginal ends of the forward net panels. The cables 58 and 59 running from the lower corner of the nets 3 and 4 and passing through the hawse pipe 52 and hawse pipe 53 on the bow of the vessel, are then hauled in and made fast. This operation securely holds the lower corners of the nets at the forward ends thereof against movement relative to the struts. (See Fig. 6). The line 57 running from the end of each strut 41, and passing through the hawse pipe 89ᵃ is then tautened so that the struts 41 and nets 3 and 4 are rigidly held at the lower edge B against lateral stress. The separators 25 extending between the nets 3, 4, at the lower edges B thereof maintain the lower edges of the nets 3; 4, in spaced relation, the forward end of the nets being connected to the submerged strut 41 in this spaced relation when the lines 58 and 59 are made taut.

The vessel then proceeds on its voyage with the nets 3, 4, in torpedo repelling position, as long as the vessel is in a danger zone.

When again in safe waters the nets are taken in by shifting them from the position shown in Fig. 5 into the suspended position shown dotted at the left in Fig. 6, in the manner hereinbefore described.

The operation of taking in the nets will now be described:—

The holding lines 58, 59, at the lower corners of the nets will be slackened. The submerged struts 41, 41, of Figs. 1, 3, and 7, when used, are then swung forwardly from the position shown in full lines into that shown by dotted lines in Figs. 1 and 3, by slackening the lines 57 and then hauling in on the lines 54 and 55.

When the corner frames 88 are substituted for the submerged struts 41, they will be lifted with the nets 3, 4, by hauling in on the lines 99, 100, and 101, simultaneously with the net lifting lines 86, 87.

The lower edges B of the nets 3 and 4 are then lifted into the position shown dotted at the left in Fig. 6, by hauling in on the series of lines 86, 87. (See Fig. 5). The loops 71 on the edge B of the nets are then operatively engaged by the hook end 65 of the levers 63 forming part of the tripping mechanism, and the levers 63 are locked in holding positions in readiness to be again tripped. The levers 63 and 67 will be moved manually in bringing them into holding engagement with the loops 71. The edge B of the outer net 4 when pulled up, necessarily remains at some distance away from the corresponding edge B of the inner net 3 because of the tubular spreaders or separators 25.

The vessel is then free to proceed in the usual manner without any hindrance whatever from the net and net handling apparatus, except for the slight friction caused by the underwater struts 41 at the bow of the vessel. These struts 41, being in the line of the vessel, do not impede its progress to any great extent.

When port is reached and it is desired to unrig the booms 26 so as to leave them free for cargo handling purposes and to permit of the vessel being placed alongside a dock or in a slip, the pins of the open sockets attaching the outboard end of the short lines 83 to each boom 26 are knocked out and the lines 84, 85, running from each net 3 and 4 over the outer sheaves 60, 61, at the end of each boom are paid out, allowing the lines 83 and the upper edges A of the nets to swing downwardly and fall into the water alongside the vessel, this operation bringing the edges A of the nets into a plane below that of the other edges B. The open sockets on one end of the guys 29 which extend from the end of the booms 26 to the top of the masts 27, are then detached. The lines 84, 85, and the guy lines 39 are then bunted in at the pivoted end of the booms 26 (as shown at the left in Fig. 6) and the vessel is in the condition shown by the unbroken lines, i. e.—the nets 3, 4 are hung at the side of the vessel in an inverted position with the edges A lowermost and the forward underwater struts 41 are in line ahead, so that the vessel can lie alongside a dock or enter a slip without interference and the booms 26 are free for handling cargo.

The advantages of my invention will be apparent to those skilled in navigation. By mounting the entire net supporting structure on the deck of the vessel and connecting the supporting structure on one side with that on the other side of the vessel provides a self-contained structure, enables the nets to be supported at a considerable distance from the vessel's sides and provides a structure having the great strength and rigidity necessary to carry the enormous weight of the nets and inward thrust of the booms. With the nets supported in this manner the application of any load or strains on the side of the vessel are avoided and overcome and the nets and net carrying apparatus are carried on the deck of the vessel. By using double nets the inner nets 3 will become effective in stopping a torpedo which has penetrated the outer net 4. The use of my improved net handling mechanism enables the nets to be carried in a position above the water line of the vessel, so as to not retard the progress of the vessel and be in readiness to be instantly lowered into torpedo repelling position. The underwater struts effectively hold the forward end of the nets in place and prevent lifting or lengthwise movement of the lower edges of the nets.

The net handling mechanism also enables the nets to be easily and quickly moved into position, to not interfere with docking the vessel or with the loading and unloading operations.

By handling the nets as has been described, it is unnecessary at any time to lift the entire weight of the net, so that the power required in manipulating the nets is greatly reduced and one serious difficulty in handling the nets is avoided and overcome.

The lower edges of the nets are maintained in spaced relation and are held at the forward end thereof against upward and sidewise movement relative to the vessel when the vessel is in motion.

The provision of the nets on the ends of the booms in torpedo repelling position on each side of the vessel, has a stabilizing effect which prevents rolling of the vessel in a heavy sea.

The apparatus is simple and is easily kept in repair.

Many modifications in the construction and arrangement of the parts forming my improved apparatus may be made without departing from my invention as defined in the appended claims.

I claim:—

1. The method of handling torpedo nets which consists in supporting a depending net outboard on a vessel, to thereby hang vertically in torpedo repelling position and lifting the lower edge of the depending net to thereby suspend the net in inoperative position above the water line of the vessel, releasing one edge of the suspended net to thereby cause the net to swing from its suspended position into depending torpedo repelling position, and lowering the outer edge of the suspended net to thereby unship the net preparatory to docking the vessel.

2. In a torpedo net, the combination with a vessel having net supporting means extending outwardly at the side thereof, of a torpedo net adapted to hang from said supporting means in torpedo repelling position, means connected to the lower edge of the net for lifting and suspending the net above the water line of the vessel, tripping mechanism forming means for releasing the lower edge of the suspended net to thereby cause the net to fall into torpedo repelling position, and means for lowering the upper edge of the net to invert and hang the net at the side of the vessel in docking the vessel.

3. In a torpedo net, the combination with a vessel having net supporting means extending outwardly at the sides thereof, of a plurality of nets adapted to hang from said supporting means in torpedo repelling position, means connecting the lower edges of said nets arranged to maintain the nets in spaced relation, means connected to the lower edge of said nets adapted to lift and suspend the nets above the water line of the vessel, and a tripping mechanism forming means for releasing the lower edge of the suspended nets to thereby cause the nets to swing into torpedo repelling position.

4. In a torpedo net, the combination with a vessel having net supporting means extending outwardly at opposite sides thereof, of a plurality of nets hanging from said supporting means and adapted to extend downwardly into torpedo repelling position, means connecting the lower edges of said nets arranged to maintain the nets in spaced relation, means connected to the lower edge of said nets adapted to lift and suspend the lifted nets above the water line of the vessel, and means for releasing said suspending means and freeing said lower edge of the suspended nets to permit the nets to swing into torpedo repelling position.

5. In a torpedo net, the combination with a vessel having outwardly extending net supporting means on opposite sides thereof, of torpedo nets hung from said supporting means and adapted to extend downwardly into torpedo repelling position, means connected to the lower edges of said nets for lifting and suspending the lifted nets above the water line of the vessel, detachable means for fastening the lifted nets in suspended position, and means for detaching said fastening means to release said lower edges and permit the suspended nets to fall into torpedo repelling position.

6. In a torpedo net, the combination with a vessel having outwardly extending net supporting means on opposite sides thereof, of a plurality of torpedo nets hung from said supporting means and adapted to extend downwardly into torpedo repelling position, means connected to the lower edges of said nets for lifting and suspending the lifted nets above the water line of the vessel, detachable means for fastening lifted nets in suspended position, means for detaching said fastening means to release the lower edges of the suspended nets and cause the nets to fall into torpedo repelling position, and means for lowering the upper edges of the nets, suspended to invert and move the inverted nets into position alongside the vessel preparatory to docking the vessel.

7. In a torpedo net, the combination with a vessel having net supporting means extending outwardly at the side thereof, of a torpedo net hung from said supporting means and adapted to extend downwardly into torpedo repelling position, and means connected to the lower edge of the net for lifting said lower edge and suspending the net above the water line of the vessel, and tripping mechanism forming means for releasing the lower edge of the suspended net to thereby free said lower edge and cause the net to fall into the water into torpedo repelling position, and means for lowering the outboard edge of the suspended net, to move the net into position alongside the vessel when the vessel is being docked.

8. In a torpedo net, the combination with a vessel having a series of booms thereon, of torpedo nets suspended from said booms and extending downwardly into torpedo repelling position, means on the lower edge of said nets extending inboard and arranged to lift the nets into suspended position above the water line of the vessel, detachable means for fastening the nets in suspended position, and means for actuating the detachable fastening means to release said fastening means and cause the nets to swing into the water in torpedo repelling position.

9. In a torpedo net, the combination with a vessel having a series of booms thereon, of torpedo nets suspended from said booms and extending downwardly into torpedo repelling position, and a submerged strut at the bow of the vessel connected to the lower edge of the net at the forward end thereof and arranged to prevent lifting movement of the end of the net when the vessel is under way.

10. In a torpedo net, the combination with a vessel having a series of booms thereon, of torpedo nets suspended from said booms and extending downwardly into torpedo repelling position, a submerged strut at the bow of the vessel connected to the lower edge of the net at the forward end thereof and arranged to prevent lifting movement of the end of the net when the vessel is under way, and means for moving said strut into and out of operative position.

11. In a torpedo net, the combination with a vessel having net supporting means extending outwardly at the side thereof, of a depending net adapted to hang from said supporting means in torpedo repelling position, flexible means connected to the lower edge of the depending net for lifting said lower edge above the water line of the vessel, said flexible means being arranged to suspend the lifted net above the water line of the vessel, and flexible means connecting the upper edge of the net to the net supporting means and arranged to lower the upper edge of the net and thereby invert and hang the net at the side of the vessel.

In testimony whereof I have hereunto set my hand.

B. C. MOISE.